United States Patent [19]

Weinert et al.

[11] 3,981,579

[45] Sept. 21, 1976

[54] APPARATUS FOR SELECTING ORIGINALS FOR COPYING ON THE BASIS OF IMAGE SHARPNESS

[75] Inventors: Volker Weinert, Munich; Friedrich Hujer, Grunwald; Walter Knapp, Munich, all of Germany

[73] Assignee: AGFA-Gevaert, A.G., Leverkusen, Germany

[22] Filed: Sept. 7, 1973

[21] Appl. No.: 395,366

[30] Foreign Application Priority Data

Sept. 9, 1972 Germany............................ 2244340

[52] U.S. Cl.................................... 355/18; 355/41; 355/133; 356/203
[51] Int. Cl.²....................................... G03B 27/00
[58] Field of Search ................. 355/68, 133, 41, 18, 355/44; 250/559; 356/202, 203; 354/25

[56] References Cited
UNITED STATES PATENTS

| | | | |
|---|---|---|---|
| 3,520,609 | 7/1970 | Lion............................... | 356/203 X |
| 3,635,555 | 1/1972 | Kurahashi............................ | 355/68 |
| 3,690,765 | 9/1972 | Rickard.............................. | 355/68 |
| 3,709,613 | 1/1973 | Zahn................................. | 355/68 X |
| 3,734,611 | 5/1973 | Knapp et al. ........................ | 355/41 |
| 3,743,416 | 7/1973 | Widmer et al....................... | 355/68 |

*Primary Examiner*—John Gonzales
*Attorney, Agent, or Firm*—Michael J. Striker

[57] ABSTRACT

The density of neighboring portions of each of a plurality of successive originals is monitored. An original is copied only if the original is comprised of at least one pair of monitored neighboring portions differing from each other in density by an amount exceeding a reference value.

17 Claims, 12 Drawing Figures

APPARATUS FOR SELECTING ORIGINALS FOR COPYING ON THE BASIS OF IMAGE SHARPNESS

BACKGROUND OF THE INVENTION

The invention relates to an arrangement for determining the image sharpness of originals in a long strip of originals to be passed through a copying or photoprinting machine.

In the development of film exposed by amateur photographers, it has become more and more the practice to connect the individual film strips end-to-end, by gluing or the like, in order to form a very long web of film material which can be transported through a fast-operating automatic copying or printing machine. Some machines of this type produce a copy or print of each original passing through the machine. Others are selective and produce a copy or print of only those originals having an average density lying within a predetermined range of densities. Originals whose average density is outside such range are not copied.

However, it is well known that in the course of processing a large number of such originals, many originals will be encountered which, although they do have an average density within the preselected range, are nevertheless of so poor a quality, due to extreme lack of image sharpness, that they are not worth printing. Copies of originals which are unclear due to improper focal settings and/or camera movements during picture taking are of course in general not desired by the photographer, and the paying of money for such unsatisfactory prints will of course be rather irritating to the consumer.

SUMMARY OF THE INVENTION

It is accordingly the general object of the present invention to provide an apparatus for determining the image sharpness of originals to be copied before they are copied, in order to prevent the copying of originals which are lacking in image sharpness.

It is more particularly an object of the invention to provide a copying apparatus in which an elongated film strip, or strip of other type of originals to be copied or printed, is automatically transported through a copying or printing station, with the originals determined to be lacking in image sharpness being automatically transported through such printing station without being copied, and possibly without even the transport of the film strip being stopped.

The inventive approach is based upon the assumption that an original bearing a sharp image will exhibit very sharp light-dark transitions. For instance, a dark object against a light background will produce a very clear-cut dark-light transition if the image is a sharp one, whereas no such clear-cut transition will occur if the image is a blurred one. Particularly of significance is the rate of change from dark to light, or from light to dark, within the image to be examined. If the rate of change is great, it can be reasonably concluded that a light-dark transition evidencing image sharpness is involved. The actual brightness of the light and dark portions bounding such a light-dark transition is of less significance than the magnitude of the rate of change from light to dark, or vice versa.

The objects enumerated above, and others which will become more understandable from the following description of specific embodiments, can be met according to one advantageous concept of the invention by providing an arrangement for selecting originals for copying on the basis of the sufficiency of the image sharpness of such originals, comprising means for monitoring the density of neighboring portions of each of a plurality of successive originals, and means for effecting the copying of an original only if such original is comprised of at least one pair of monitored neighboring portions differing in density by an amount exceeding a reference value. The reference value can be a constant value, a value which is selectably adjustable such as when dealing with several kinds of film, a value which is automatically varied or adjusted in dependence upon one or more operating conditions or parameters such as film transport speed, or even a value which varies in functional dependence upon the monitored density itself.

The novel features which are considered as characteristic for the invention are set forth in particular in the appended claims. The improved arrangement itself, however, both as to its construction and its mode of operation, together with additional features and advantages thereof, will be best understood from the following description of specific embodiments when read in connection with the accompanying drawings.

DESCRIPTION OF THE PREFERRED EMBODIMENTS

Figure 1:
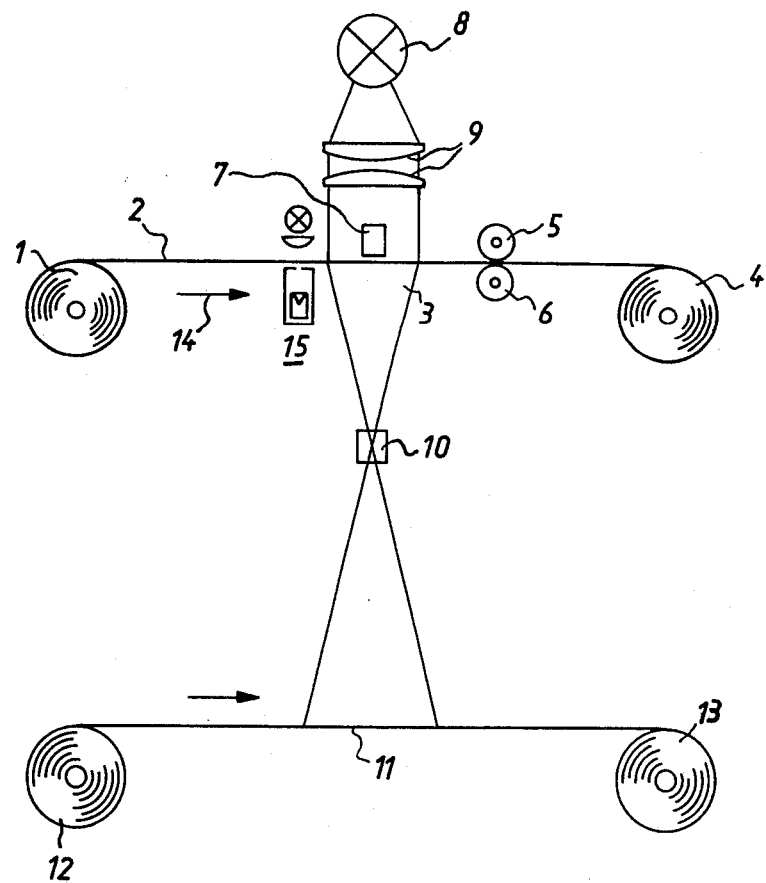
FIG. 1 depicts in schematic manner an automatic printing machine for making prints from exposed photographic film.

FIG. 1 depicts in schematic form a copying arrangement which can be used according to the present invention. The copying arrangement includes a supply reel 1 onto which is wound a long strip 2 of originals, for instance exposed film strips glued together at the strip ends to form a very long strip. The long strip 2 of originals is transported through a copying station 3 to a take-up reel 4. The transport of the strip 2 is effected by means of transport rollers 5, 6 and an arrangement 7 which detects (non-illustrated) notches or holes at the sides of the strip, and synchronizes the operation of the transport rollers 5, 6 with the detection of such notches or holes. For example, when a notch is detected indicating that a particular original of strip 2 has reached the copying station, the rollers 5, 6 will be temporarily halted, to permit a copying operation to take place, whereafter the rollers 5, 6 will be activated again to move the copied original further along the illustrated path to the take-up reel 4.

The copying station 3 comprises a light source 8 and a condensing lens arrangement 9, provided to pass light through the original located at the copying station 3. The light passing through the original is focussed by an objective 10 onto a light-sensitive copying material 11. The copying material 11 is provided in the form of an elongated web travelling from a supply roll 12 to a take-up roll 13, with the transport of the copying material 11 being performed (by non-illustrated means) in synchronism with the transport of the strip 2.

The direction of transport of the film strip 2 is indicated by arrow 14. Upstream of the copying station 3 there is provided a photoelectric detecting stage 15, whose construction is described in greater detail below. The photoelectric detecting stage 15 is comprised of a small detecting element which monitors the light transmissive character of an original prior to the entry of the original into the copying station 3. Of course, in the event that the original is not appreciably translucent, it would be possible to instead monitor the light reflective character of such original. In particular, it is the purpose of the photoelectric detecting stage 15 to monitor the image sharpness of the images on the originals, and to prevent copying of an original when it is determined that the image sharpness of the image on the original is not satisfactory.

Figure 2A:
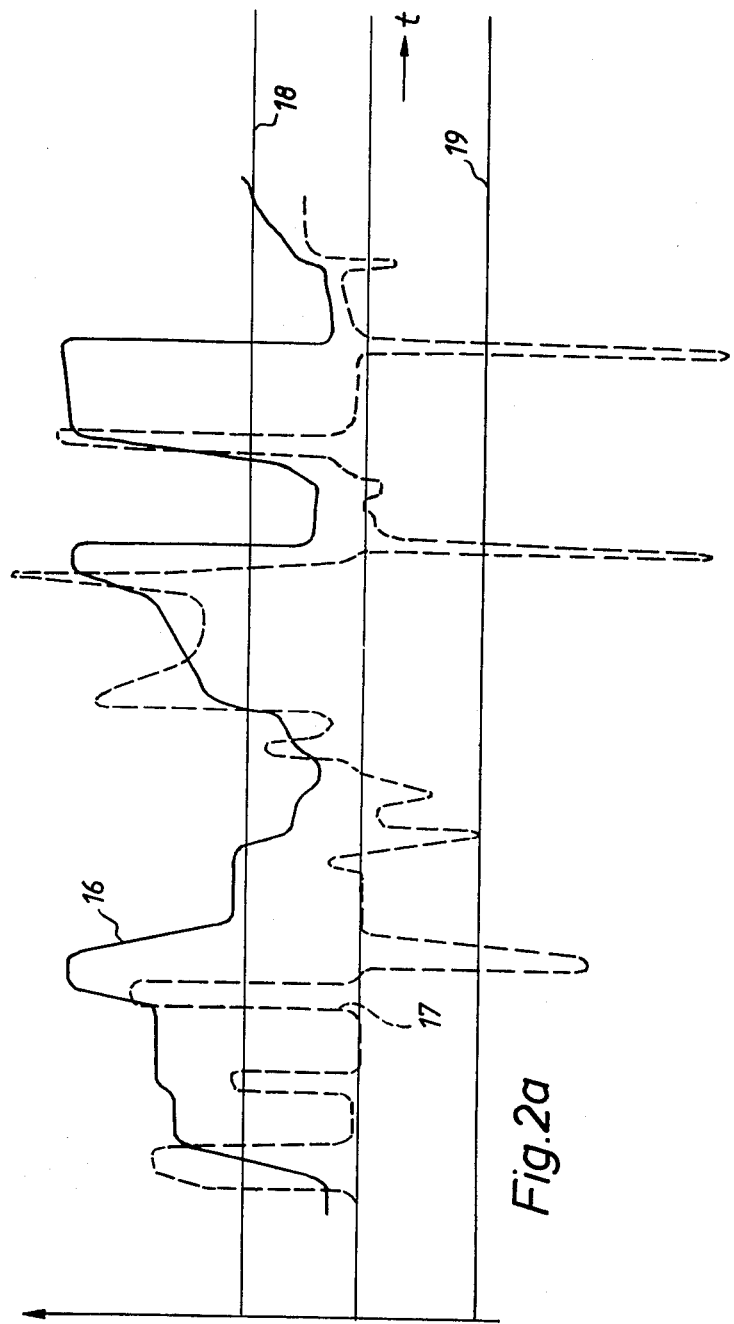
FIG. 2a depicts the waveform generated by monitoring the transparency or density of an original along a line parallel to the direction of film transport, and also depicts a waveform representing the time derivative of the first waveform.

FIG. 2a depicts one exemplary curve 16 typical of the variation in the light transmissivity or density that would be detected by the detecting arrangement 15 as a typical original forming part of strip 2 is moved past the arrangement 15. The transparency, or by inclusion of an intermediate logarithmic amplifier the density, of the original changes from low values to high values and back to low values, in the manner graphically depicted. The very steep portions of curve 16, whether upwardly sloping or downwardly sloping, represent transitions between dark and light regions, the steepness of the rise or fall of the curve constituting a measure of the image sharpness.

Curve 17 represents the first derivative of the curve 16. When curve 16 has a steep portion, curve 17 has a relatively high positive or negative value, whereas when curve 16 is horizontal or only somewhat steep curve 17 has zero value or a very low positive or negative value.

According to one advantageous concept of the invention, a positive threshold value 18 and a negative threshold value 19 are established, and a determination is made of when the instantaneous value of the first derivative curve 17 rises above value 18 or falls below value 19.

Figure 2B:
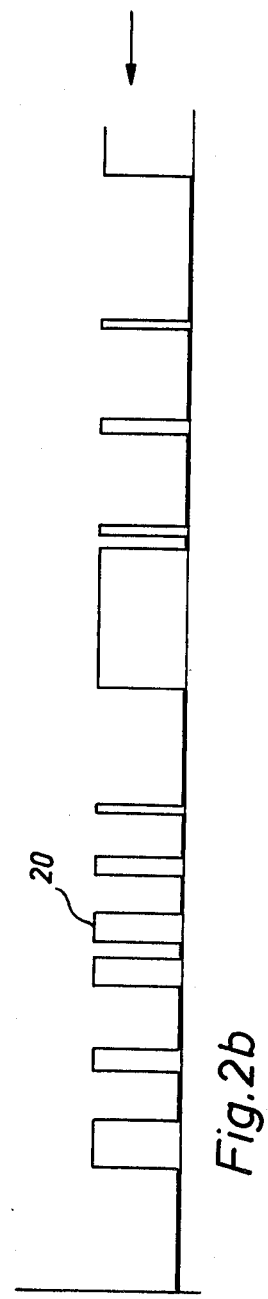
FIG. 2b a waveform which can be derived from the waveforms shown in FIG. 2a and which is useful in the automatic assessment of image sharpness.

As one possibility, this information can be used to generate a train of equal-amplitude pulses 20 (FIG. 2b) whose pulse durations correspond to the time intervals during which the curve 17 is outside the boundary values 18 and 19. Whether the curve 17 is negative or positive, with such an approach, is of no significance, inasmuch as both negative and positive rates of change are indicative of sharp transitions between light and dark regions. These pulses 20 can be summed up, in one or more of several ways to be described, and the resulting value can be employed as a measure of the image sharpness.

Figure 3:
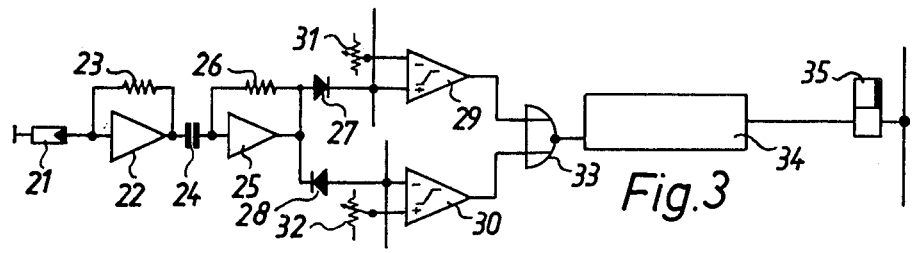
FIG. 3 depicts a first embodiment of a circuit operative for automatically assessing image sharpness and controlling the copying of originals in dependence thereon.

FIG. 3 depicts a first exemplary circuit capable of mathematically evaluating the curve 16 of FIG. 2a. The photoelectric transducer is here provided in the form of a photoelement 21 having one terminal connected to ground and another terminal connected to the input of an amplifier 22. Amplifier 22 is provided with a feedback resistor 23 of the type commonly employed in operational amplifier circuits. The feedback resistor 23, if desired, could be replaced by a diode, so as to impart a generally logarithmic input-output transfer function to the amplifier 22. The output signal of amplifier 22 is applied to a differentiator capacitor 24. The output of differentiator capacitor 24 is applied to the input of a further operational amplifier 25. The output of amplifier 25 is connected to the input thereof by a conventional operational-amplifier feedback resistor 26. Furthermore connected to the output of amplifier 25 is the anode of a diode 27 and the cathode of a diode 28. The cathode of diode 27 is connected to the positive input of a comparator 29, whereas the anode of diode 28 is connected to the negative input of a comparator 30. The other input of each of the two comparators 29, 30 is connected to a respective one of potentimeters 31, 32, which potentiometers can be varied to set the respective threshold values 18 and 19 shown in FIG. 2a. The outputs of comparators 29 and 30 are connected to the inputs of an OR-gate 33, the output of which is connected to a counter 34. The counter 34 triggers a flip-flop 35 to a predetermined state thereof, when the number of pulses counted by the counter 34 reaches a predetermined value. The reaching of such value indicates a satisfactory image sharpness, and when the flip-flop 35 is triggered in the manner just mentioned, the copying of the original which has been thusly evaluated is permitted to proceed. When the flip-flop 35 is in its other state, this indicates that the image borne by the original in question is of insufficient sharpness. When flip-flop 35 is in this other state, the copying of the original in question is prevented and instead the transport arrangement is activated and the unsatisfactory original passes through the copying station 3 without being copied.

Figure 4:
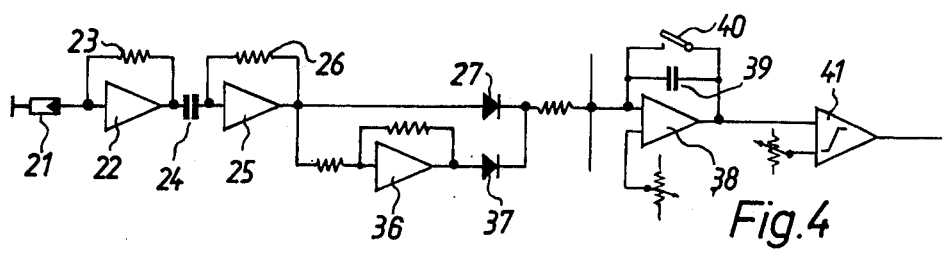
FIG. 4 depicts a second circuit operative for automatically assessing image sharpness and controlling the copying of originals in dependence thereon.

FIG. 4 depicts a variation of the circuit shown in FIG. 3. Components in FIG. 4 identical to those of FIG. 3 are identified with the same reference numerals. Connected to the output of amplifier 25 is the anode of a diode 27. This diode 27 passes output signals of one polarity. Also connected to the output of amplifier 25 is an inverter stage 36 to the output of which is connected a diode 37. The components 27, 36 and 37 together constitute a full-wave rectifier for the output signals appearing at the output of amplifier 25. The signals appearing at the cathodes of diodes 27, 37 are applied to the input of an integrating circuit 38, 39, 40. The integrating circuit is comprised of an operational amplifier 38 provided with a feedback capacitor 39 and a capacitor-discharging switch 40. The voltage generated at the cathodes of diodes 27, 37 is applied, via a resistor, to the input of the integrating circuit. The voltage appearing at the output of amplifier 38 is applied to a comparator 41, whose threshold voltage is established by setting a potentiometer connected to the input thereof. When the voltage developed at the output of amplifier 38 reaches the threshold value of the comparator 41, the flip-flop 35 of FIG. 3 is triggered in the same manner as described with respect to FIG. 3. After an original has moved past the photoelectric detector stage 15, non-illustrated means briefly close capacitor-discharging switch 40, to reset the integrator for the evaluation of the next original in the strip 2.

Figure 5:
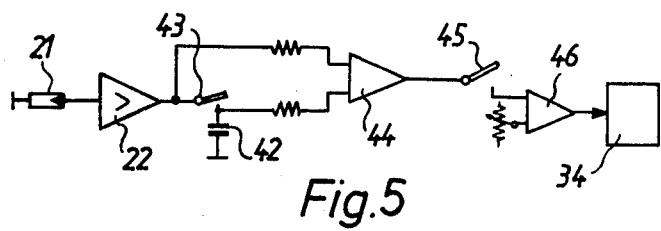
FIG. 5 depicts a third such circuit.
Figure 6:
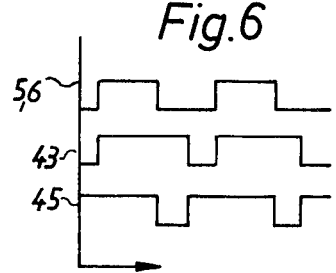
FIG. 6 depicts in graphical form certain aspects of the operation of the circuit shown in FIG. 5.

Another embodiment is shown in FIG. 5. The output of amplifier 22 is applied directly to onne input of a difference amplifier 44, via a resistor. The output of amplifier 22 is also applied to the other input of difference amplifier 44, but through the intermediary of a delay stage comprised of a capacitor 42. A switch 43 connects the output of amplifier 22 to the capacitor 42 and thereby to the second input of difference amplifier 44. The sequence of closing of the switches 43 and 45, and the timing of the operation of transporting rollers 5, 6 is depicted graphically in FIG. 6. The output signal of amplifier 44 is applied via the second switch 45 to one input of a comparator 46, to whose other input of voltage is applied to establish the threshold values 18, 19. Connected to the output of comparator 46 is a counter 34, like the counter 34 in FIG. 3. Moreover, the output of counter 34, like that of the counter 34 in FIG. 3, is connected to a flip-flop 35 which performs in the manner described with reference to FIG. 3. The arrangement of FIG. 5 is intended for use when the film transport occurs in stepwise manner and/or when the photoelectric monitoring of the originals to be copied is to be performed in a pulsed or discontinuous manner, with a series of discrete measured values being produced instead of a smooth curve. A continuous curve of measured values can be differentiated in the manner described before, but a series of discrete measured values cannot be similarly differentiated. The stepping length of the transport steps corresponds to the length of the detected region on the original, and the time intervals for which switch 45 is closed are such that the areas of measurement associated with successive pulses adjoin each other substantially without any intervening gaps.

The course of the evaluation cycle is such that during a transport step and for the first half of the transport interval the switch 43 is open. Accordingly, the capacitor 42 stores the value associated with the monitoring of the previously monitored region. After the transport step, there is applied to the second input of amplifier 44 the value associated with the monitoring of the next-following region, whose monitoring has just been completed, so that a difference signal is present on the output of amplifier 44. This difference signal is now applied, when switch 45 is closed, to the comparator 46, this occurring only during the first half of the standstill time interval, i.e., so long as the signal corresponding to the previously monitored region is still registered by the capacitor 42. For each successive pair of monitored regions the difference is determined only once and compared to the threshold values, to that again only a single pulse is applied to the counter 34. The evaluation of the count registered by counter 34 is performed in the manner described above. Advantageously, the comparator 46 shown in FIG. 5 will be a two-threshold device, generating an output signal when the input signal is higher than value 18 or lower than value 19 in FIG. 2a.

The circuit arrangements depicted in FIGS. 3–6 are capable only of detecting dark-light transition edges such as are oriented transverse to the direction of film transport. Dark-light transition edges lying exactly parallel to the transport direction cannot be detected with these circuits, since evidently the monitored value all along the length of such a dark-light transition edge will not change very sharply. To be able to detect such dark-light transition edges as are oriented parallel or substantially parallel to the film transport direction, use can be made of the circuit depicted in FIG. 7.

Figure 7:
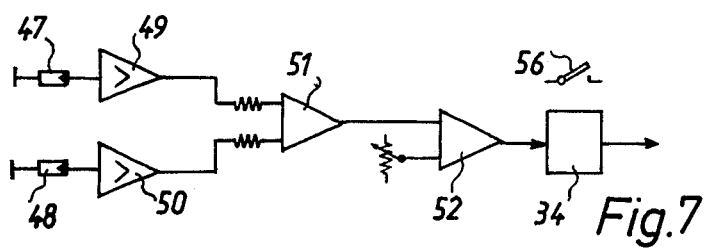
FIG. 7 depicts a fourth circuit operative for automatically assessing image sharpness and controlling the copying of originals in dependence thereon.

The circuit of FIG. 7 makes use of two photoelectric transducers 47, 48 located closely adjacent each other and spaced from each other in direction perpendicular to the direction of film transport. The signal developed by each of the transducers 47 and 48 is applied to the input of a respective one of two amplifiers 49 and 50. The output signals of amplifiers 49, 50 are applied to the two inputs of a difference amplifier 51. The output signal of difference amplifier 51 is applied to a comparator 52. Comparator 52 is operative for determining whether the input signal applied to it is above the value 18 (FIG. 2a) or below the value 19 (FIG. 2a). If the signal is in fact outside the range between values 18 and 19, then the comparator 52 applies a signal to a resettable counter 34. The count registered on counter 34 is employed as described with respect to the previous examples. It will be appreciated that in the event that the threshold values 18, 19 for comparator 52 are of equal magnitude but opposite polarity, the two threshold values can be established by adjusting a single potentiometer connected to the input of comparator 52.

Figure 8:
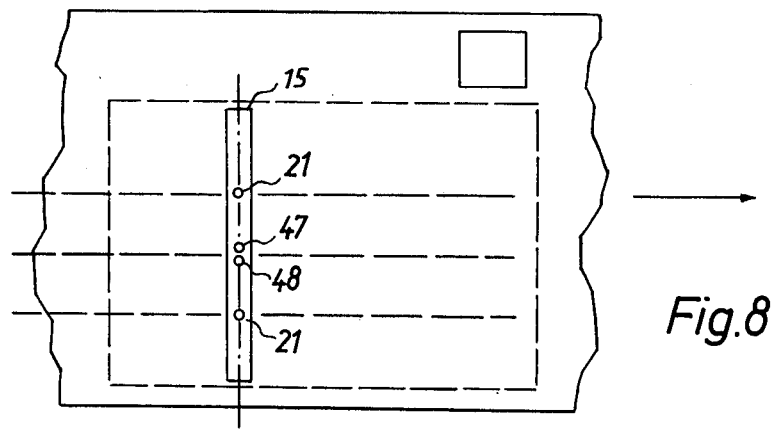
FIG. 8 depicts the positioning and orientation of a plurality of light detecting units relative to the location and direction of travel of a film strip.

FIG. 8 depicts the positions of the several photoelectric transducers described with respect to FIGS. 3–7, including the closely spaced pair of transducers 47, 48 shown in FIG. 7, relative to the position and direction of travel of the film strip. In FIG. 8, the photoelectric detecting stage is again generally designated with reference numeral 15.

Figures 9, 10:
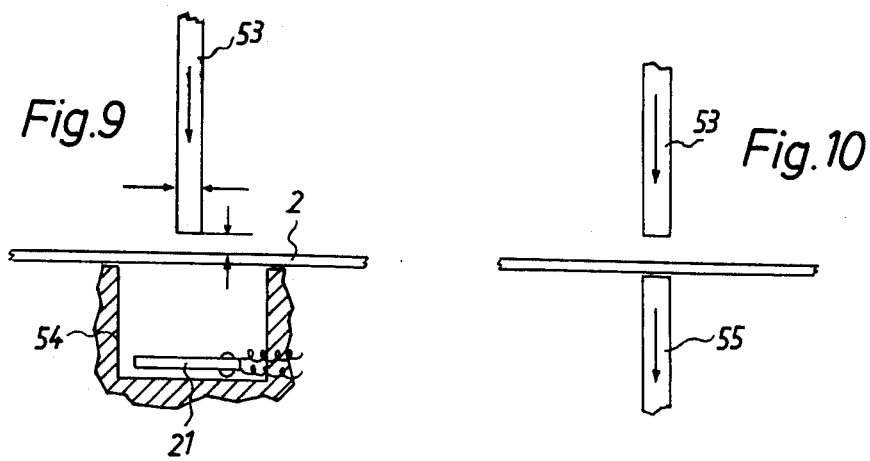
FIG. 9 depicts a first embodiment of a photoelectric detector unit.
FIG. 10 depicts a second embodiment of a photoelectric detector unit.

The construction of the detecting elements is largely dependent upon the size of the small regions into which the original of strip 2 is to be divided. In general, the photoelectric transducers themselves are too large and would result in very coarse measurements. Advantageously, as shown in FIG. 9, use is made of a fiber-optic element 53 exposed at one end to the light source employed for the density monitoring and having its other end closely adjacent to the film strip 2. The diameter of the fiber-optic element 53 can have values of about 0.1 mm, and will then substantially correspond to the size of the region to be monitored, provided that the distance between the end of the fiber-optic element 53 and the film 2 is sufficiently small. The actual size of the photoelectric transducer 21 then becomes of secondary importance, provided that the remaining geometrical relationships are made readily reproducible and provided that the transducer 21 is shielded from the influence of stray light. To this end, the transducer 21 is provided in a recessed compartment 54 which protects the transducer from the incidence of stray light. In the version shown in FIG. 11, the protection of the transducer from the effect of stray light is increased by covering the area above the transducer with a light shield provided with a small passage 54a just large enough and so oriented as to permit substantially only a limited beam of light to fall upon the transducer. As a further possibility, the fiber-optic elements can be so separated from each other as to make the size of the transducers 21 substantially independent of the size of the region to be monitored.

A still further possibility is shown in FIG. 10. Here, two fiber-optic elements 53 and 55 are employed. The upper element 53 transmits a beam of light from a non-illustrated light source through the film strip and to the lower element 55 which in turn transmits the light beam to a non-illustrated photoelectric transducer positioned at some convenient location.

Figure 11:
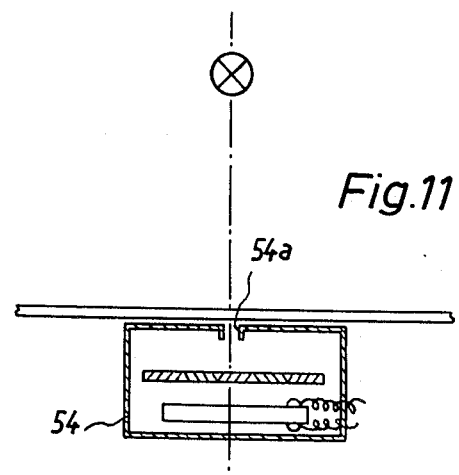
FIG. 11 depicts a third embodiment of a photoelectric detector unit.

Finally, in the case of originals bearing color images, it may be desirable to place a color filter in the path of the light passing through the film, such a color filter being shown, for example, in FIG. 11. With the provision of such a filter, the variations in light transmission of the original on the strip 2 are monitored only with respect to a particular color or colors.

The depicted arrangements and approaches are to be considered only exemplary. Other modifications are comprehended within the invention. For example, instead of determining image sharpness sufficiency on a cumulative basis, i.e., by counting or integrating or in some other manner combining a number of measurements taken with respect to a single original, it would also be possible to make the determination on the basis of the detection of a single light-dark transition edge of sufficiently great contrast. Upon detection of such a transition edge, the copying operation would be allowed to proceed, such detection being assumed to be sufficient evidence of satisfactory image sharpness. However, with such an approach it is important to so orient the parts of the detecting unit that they will not respond to the edges of the image field, where the contrast between the image itself and the surrounding border is very sharp.

Moreover, it is possible and advantageous to combine the several approaches described above in any of several different ways. For instance, the cumulative approach can be combined with the last-mentioned approach according to which the determination is made on the basis of the detection of a single light-dark transition edge of sufficient sharpness.

Furthermore, the positioning of the detecting element can be varied in dependence upon the requirements of a particular application. For example, the detecting elements can be located more or less near the sides of the elongated film strip, depending upon the type of originals to be copied, e.g., in dependence upon whether outdoor film of indoor film is being processed. In addition, the threshold value 18 and 19 (see FIG. 2) need not be constant and need not be equal in magnitude. They can advantageously be adjustable, so as to be set in dependence upon the average density of the particular film strip or type of film strip, or type of original, to be printed or copied. It will be appreciated that the measurement of rates of change of density, in the manner described above, is dependent upon the transport speed of the strip 2. Any increase in the transport speed will make for an increase in the detected rate of change of density; and therefore the transport speed, if it is set to different values for different applications, must be appropriately discounted, by suitably adjusting the threshold values 18 and 19.

It will be understood that each of the elements described above, or two or more together, may also find a useful application in other types of circuits and constructions differing from the types described above.

While the invention has been illustrated and described as embodied in a method and apparatus for determining the image sharpness of images carried on originals to be copied, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be protected by Letters Patent is set forth in the appended claims:

1. In an arrangement for copying originals, an arrangement for selecting originals to be copied on the basis of the sufficiency of the image sharpness of such originals, comprising, in combination, a copying station having means for copying an original; means for monitoring the rate of change of density across each original; and means for automatically preventing copying of an original unless the monitored rate of change of density of such original at least once exceeds a predetermined reference value.

2. The arrangement defined in claim 1, wherein said means for monitoring comprises a photoelectric detector, means for effecting relative motion between each of said plurality of originals and said photoelectric detector, means for generating for each original a first continuous waveform indicative of the variations in the density of that portion of the original which has moved past said photoelectric detector, means for differentiating said first waveform to form a second continuous waveform corresponding to the rate of change of density of such portion of the original, and means for generating a third waveform corresponding to the time integral of the magnitude of those portions of said second waveform having values outside a preselected range of values, said means for preventing copying comprising means for preventing copying of an original unless the generated third waveform associated with such original exceeds a predetermined value.

3. The arrangement as defined in claim 1, wherein said means for monitoring comprises means for determining for each monitored original the number of times said rate of change rises above the respective reference value, said means for preventing copying comprising means for preventing copying of a monitored original unless said number is at least equal to a preselected number.

4. The arrangement as defined in claim 1, wherein said means for monitoring comprises means for determining for each original the number of times said rate of change rises above a first predetermined reference value and the number of times said rate falls below a second predetermined reference value lower than said first reference value, said means for preventing copying comprising means for preventing copying of a monitored original unless the sum of said numbers associated with the respective monitored original is at least equal to a preselected number.

5. The arrangement defined in claim 1, wherein said means for monitoring the rate of change of density across each original comprises means for monitoring the rate of change of density by monitoring the densities of neighboring small portions on each original.

6. The arrangement defined in claim 5, wherein said means for preventing copying comprises means for preventing copying of an original unless such original has a predetermined plurality of pairs of neighboring portions each composed of two neighboring portions differing from each other in density by an amount exceeding said predetermined reference value.

7. The arrangement defined in claim 5, wherein said means for monitoring comprises a photoelectric detector, means for effecting relative motion between each of said plurality of originals and said photoelectric detector, means for generating for each original a first waveform indicative of the variations in the density of that portion of the original which has moved past said photoelectric detector, and means for generating a second waveform corresponding to said first waveform but delayed in time with respect to said first waveform, said means for preventing copying comprising means for preventing copying of an original unless the difference in the instantaneous values of the first and second waveforms associated with such original at least once exceeds a predetermined value.

8. The arrangement defined in claim 5, wherein said means for monitoring comprises a photoelectric detector, means for effecting relative motion between each of said plurality of originals and said photoelectric detector, means for generating for each original a first waveform indicative of the variations in the density of that portion of the original which has moved past said photoelectric detector, and means for generating a second waveform corresponding to the first waveform but delayed in time with respect to the first waveform, said means for preventing copying comprising means for preventing copying of an original unless the difference in the instantaneous values of the first and second waveforms associated with such original rises above a predetermined value a number of times at least equal to a preselected number.

9. The arrangement defined in claim 5, wherein said means for monitoring comprises a photoelectric detector, means for effecting relative motion between each of said plurality of originals and said photoelectric detector, means for generating for each original a first waveform indicative of the variations in the density of that portion of the original which has moved past said photoelectric detector, means for generating for each original a second waveform corresponding to the first waveform but delayed in time with respect to the first waveform, and means for determining for each original the number of times the difference in the instantaneous values of the respective first and second waveforms moves outside a preselected range of values, said means for preventing copying comprising means for preventing copying of an original unless the number of such times associated with the respective original is at least equal to a preselected number.

10. In an arrangement for copying originals, an arrangement for selecting originals to be copied on the basis of the sufficiency of the image sharpness of such originals, comprising, in combination, means for transporting a film strip in a path past a copying station, means for monitoring the rate of change of density across each original by monitoring the densities of neighboring small portions on each original, said monitoring means comprising a pair of adjoining photoelectric detectors oriented side-by-side in a direction transverse to the direction of film transport positioned at a predetermined location along said path upstream of said copying station; and means for automatically preventing copying of an original unless the monitored rate of change of density of such original at least once exceeds a predetermined reference value.

11. The arrangement defined in claim 10, wherein said means for preventing copying comprises difference amplifier means having a first input connected to one of said pair of detectors and a second input connected to the other of said pair of detectors, and a comparator connected to the output of said difference amplifier to determine when the difference in densities detected by said pair of detectors exceeds said predetermined reference value.

12. In an arrangement for copying originals, an arrangement for selecting originals to be copied on the basis of the sufficiency of the image sharpness of such originals, comprising, in combination, means for transporting a film strip past a copying station along a predetermined path; means for monitoring the rate, of change of density across each original comprising photoelectric detector means positioned at a predetermined location along said path upstream of said copying station and including a fiber-optic element so positioned with respect to the path of travel of the film strip as to cause a beam of light to pass through the film strip, and photosensitive means operative for determining the amount of light passing through the film strip; and means for automatically preventing copying of an original unless the monitored rate of change of density of such original at least once exceeds a predetermined reference value.

13. The defined in claim 12, wherein said photosensitive means comprises a further fiber-optic element positioned on the side of said film strip opposite the side at which is located the first-mentioned fiber-optic element and operative for transmitting to a photoelectric device the light passing through said film strip.

14. In an arrangement for copying originals, an arrangement for selecting originals to be copied on the basis of the sufficiency of the image sharpness of such originals, comprising, in combination, means for transporting a film strip in a path past a copying station; means for monitoring the rate of change of density across each original, comprising photoelectric detector means positioned at a predetermined location along said path upstream of said station and including a light source located to one side of the path of travel of the film strip and a light-sensitive element located to the other side of such path of travel, with said detector means and said light-sensitive element being so oriented that light from said source passes through the film strip and impinges upon said light-sensitive element, and a light shield positioned intermediate said light source and said light-sensitive element for permitting substantially only light rays originating from said source to impinge upon said light-sensitive element; and means for automatically preventing copying of an original unless the monitored rate of change of density of such original at least once exceeds a predetermined reference value.

15. In an arrangement for copying originals, an arrangement for selecting originals to be copied on the basis of the sufficiency of the image sharpness of such originals, comprising, in combination, means for transporting a film strip in a path past a copying station; including intermittent drive means operative for effecting periods of transport of said film strip alternating with periods of film strip standstill; means for monitoring the rate of change of density across each original, comprising photoelectric detector means positioned at a predetermined location along the path of travel of the film strip upstream of the copying station; and means for automatically preventing copying of an original unless the monitored rate of change of density of such original at least once exceeds a predetermined reference value, comprising a difference amplifier having a first input permanently connected to the output of said photoelectric detector means and having a second input, means for registering the density detected by said photoelectric detector means and operative for applying to said second input an electrical signal indicative of such registered density, means operative for operatively connecting said means for registering to said output of said photoelectric means during the time periods of film transport, comparator means having an input, and means operative for applying the output signal of said difference amplifier to said input of said comparator means during the time period of film transport, and means for disconnecting said photoelectric means from said means for registering during the time period of film standstill.

16. In an arrangement for copying originals, an arrangement for selecting originals to be copied on the basis of the sufficiency of the image sharpness of such originals, comprising, in combination, means for transporting an elongated film strip past a copying station along a predetermined path, means for monitoring the rate of change of density across each original, including photoelectric detector means positioned at a predetermined location along said path upstream of a copying station; and means for automatically preventing copying of an original unless the monitored rate of change of density of such original at least once exceeds a predetermined reference value.

17. In an apparatus for copying originals, an arrangement for selecting originals to be copied on the basis of sufficiency of image sharpness of such originals, comprising means for transporting successive originals of an elongated film strip past a copying station along a predetermined path; means for monitoring the density of neighboring portions of successive originals of said strip, including photoelectric detector means positioned at a predetermined location along said path upstream of said copying station; and means for effecting copying of an original only if such original has at least one pair of monitored neighboring portions differing in density by an amount exceeding a predetermined reference value, including means for varying said predetermined reference value in proportion to variations in the speed of transport of said strip.

* * * * *